United States Patent [19]

Lepley

[11] 3,942,656

[45] *Mar. 9, 1976

[54] MATERIAL DISLODGING MEANS FOR SILO

[75] Inventor: James W. Lepley, Smithville, Ohio

[73] Assignee: Flying Dutchman, Inc., Smithville, Ohio

[ * ] Notice: The portion of the term of this patent subsequent to Aug. 13, 1991, has been disclaimed.

[22] Filed: June 6, 1974

[21] Appl. No.: 476,783

Related U.S. Application Data

[63] Continuation of Ser. No. 389,141, Aug. 17, 1973, Pat. No. 3,828,947.

[52] U.S. Cl. .......... 214/17 DA;
[51] Int. Cl.² .......... B65G 65/46
[58] Field of Search ...... 214/17 D, 17 DA; 222/228; 239/658; 172/45, 612

[56] References Cited

UNITED STATES PATENTS 3,406,914 10/1968 Lepp et al. .......... 239/658
3,828,947 8/1974 Lepley .......... 214/17 DA

*Primary Examiner*—Robert G. Sheridan
*Attorney, Agent, or Firm*—Mason, Kolehmainen, Rathburn & Wyss

[57] ABSTRACT

Material dislodging means for a bottom unloading type silo having a central vertical shaft projecting upwardly from the bottom adjacent an outlet opening therein and including a series of chains connected at one end to said shaft in vertically spaced relationship and of progressively greater length with the shortest being lowermost, said connections comprising openings extending diametrically through said shaft to receive said ends of said chains to provide effective, long lasting flexible connections for said chains. The outer ends of the chains have digging and raking elements connected thereto by means of sockets on said elements which receive at least the terminal outer link of each chain. Pin means connect the opposite ends of the chains respectively within said openings in said shaft and said sockets on said elements.

13 Claims, 12 Drawing Figures

MATERIAL DISLODGING MEANS FOR SILO

BACKGROUND OF THE INVENTION

This applicaton is a continuation of copending U.S. application Ser. No. 389,141, filed Aug. 17, 1973, now U.S. Pat. No. 3,828,947, issued Aug. 13, 1974.

Due to the progressively increased diameters and heights of silos used to store forage material or feeding livestock and especially dairy cows and the like, the use of bottom discharge means for such silos has become increasingly popular. Examples of such bottom discharge means are illustrated in the following prior patents; U.S. Pat. No. 3,424,350 to J. H. Herr et al., dated Jan. 28, 1969; U.S. Pat. No. 3,567,078 to J. H. Herr et al., dated Mar. 2, 1971; U.S. Pat. No. 3,710,960 to A. Z. Stauffer et al., dated Jan. 16, 1973.

Although the bottom discharge means illustrated in said prior patents have been highly satisfactory in general, it has been found in particular however that the connections of the material-dislodging chains employed in said prior structures respectively to the center shaft and the digging or raking elements on the ends of said chains have presented difficulties. The connections previously employed in said patent structures have not had nearly as long a life as is desirably, whereby various expedients have been developed and tested in an effort to provide connecting means having a greater life and thereby minimizing the periods of inactivity of such unloading means such as when it was necessary to replace the previously used connecting means. Such replacement consumes substantial amounts of time. Although chains formed from harder materials have been employed, as well as harder bolts and the like used in effecting such connections of the ends of the chains to the shaft and digging elements, it has been concluded that these expedients per se have not been sufficient to produce the desired results. Therefore, structural differences have been devised which comprise the present invention and these have been found to produce greatly improved operational characteristics and longer life than the connection means previously and presently used with respect to said chains. In addition, the effort required to effect such connections is not increased over that which is previously required. Details of said improvements are set forth hereinafter, as follows:

SUMMARY OF THE INVENTION

It is the principal object of the present invention to provide improved means for connecting the opposite ends of flexible material-dislodging means in a bottom unloading type silo respectively to the central shaft and the digging and raking elements connected to the outer ends of said chains.

It is another object of the invention to employ a preferably tubular central shaft which extends upwardly from the bottom of a silo adjacent the discharge opening in said bottom, the lower end of said shaft receiving the upper portion of a drive shaft which extends centrally upward from below the the bottom of the silo for purposes of supporting and driving said tubular shaft, said tubular shaft providing ready means for forming openings extending transversely therethrough at vertically spaced locations respectively to receive one end of said material-engaging chains which extends transversely of said shaft through said openings.

It is a further object of the invention to dispose short sleeves within said transverse openings in the shaft and fix the same thereto, one end of each tube preferably being substantially flush with the outer surface of the shaft, and the opposite end of said tube projecting radially beyond the opposite surface of the shaft for purposes of receiving connecting pin means such as a bolt which extends through openings in said projecting end of the tube and also extending through the terminal link in the end portion of the chain which is disposed within said tube, whereby the link of the chain which extends from the flush end of the tube serves as a highly satisfactory connecting means for that portion of the chain which extends beyond said shaft and the tube therein.

Still another object of the invention is to provide different types of elements connected to the ends of said chains, depending upon the location and length of the chains, one type of element comprising digging members which are connected to the longest chains which are disposed adjacent the upper end of the shaft, while the shorter chains have raking members connected thereto which are of a different configuration from the digging members, said digging and raking members being provided with sockets extending from one face thereof for purposes of receiving at least the terminal link of the outer ends of the chains, and aligned openings being formed in opposite walls of the sockets to receive pin means, such as bolts, which also extend through said terminal links of the chains and thereby effectively secure the digging and raking members flexibly to the outer ends of said chains said arrangement also having been found to greatly extend the life of connecting means by which such digging and raking members are connected to the chains in comparison with expedients previously employed.

A still further object of the invention ancillary to the immediate foregoing object is to form said sockets on the digging and raking members so as to be substantially square in cross section, whereby the terminal links of said chains are inserted in said sockets between opposite corners thereof and thereby provide accurate positioning means for said ends of the chains within said socket.

Details of the foregoing objects and of the invention, as well as other objects thereof, are set forth in the following specification and illustrated in the accompanying drawings comprising a part thereof.

DETAILED DESCRIPTION

Figure 1:
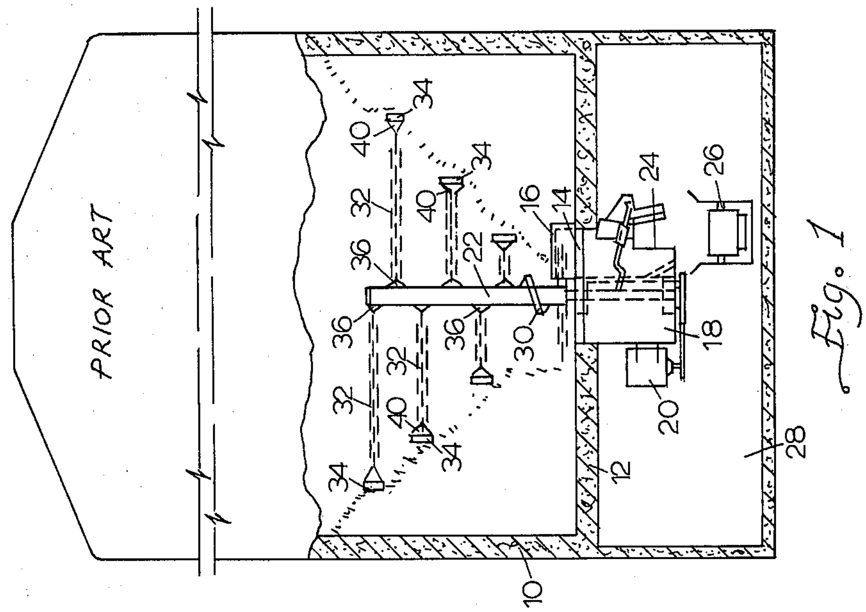
FIG. 1 is a vertical elevation of a typical silo of the type to which the present invention pertains, the major portion of said view being in vertical section and the same also being broken transversely to foreshorten the view, said figure representing the prior art.
Figure 2:
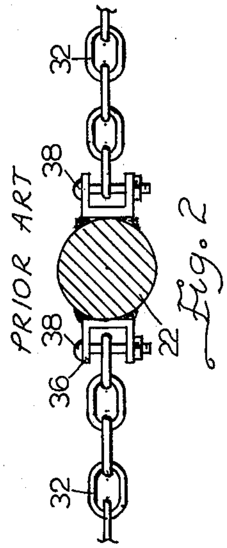
FIG. 2 is a fragmentary transverse sectional view as seen on the line 2—2 of FIG. 3 and illustrating in plan view the means utilized in the prior art for connecting the inner ends of the chains to the vertical shaft in the silo.
Figure 3:
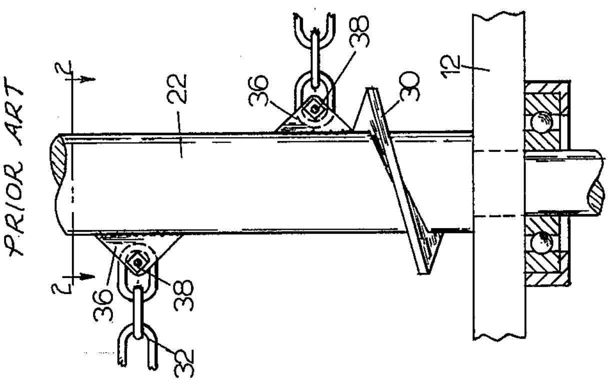
FIG. 3 is a fragmentary vertical elevation of the lower portion of the shaft of the silo shown in FIG. 1 and illustrating side elevations of the means by which the inner ends of the chains are connected to the central shaft in the prior art.

Referring to FIGS. 1–3, the same illustrate a bottom unloading type of silo now currently in use and therefor comprising the prior art. Certain characteristics and features of said silo are illustrated in one or more of the recent patents set forth hereinabove. In FIG. 1, it will be seen that the silo 10 comprises a preferably cylindrical wall of predetermined height and diameter. It is provided with a bottom 12 which has a discharge opening 14 therein over which a metering device 16 at least partially extends to prevent choking the discharge opening 14 such as when a substantial amount of silage material stored within the silo falls by gravity incident to an unloading operation being undertaken. Material receiving means 18 are mounted below the bottom 12 and includes a motor 20 comprising power means by which a central shaft 22 is rotated about its axis. The shaft is supported by bearings within the material receiving means 18 which also include discharge mechanism 24 which preferably emptys into a conveyor 26 for purposes of moving the material upwardly from the lower compartment 28 within which the material receiving means 18 is mounted.

A relatively short auger 30 is mounted upon the lower end of the central shaft 22, primarily for purposes of effecting initial discharge movement of compacted silage material within th silo 10, especially when operation of the discharge mechanism is being initiated, at which time silage material usually is compacted around the auger as the result of having fallen by gravity from the bulk of materials stored within the silo. Material-engaging and dislodging means also include a series of chains 32, one end of each of the same being connected to the shaft 22 and said chains being of progressively greater length from the lower end to the upper end of the shaft 22. Material digging elements 34 are connected to the outer ends of said chains and the inner ends thereof are connected to the shaft 22 by means of clevises 36, details of which are best shown in FIGS. 2 and 3.

As seen from FIG. 2, the clevises 36, in plan view, are substantially U-shaped and comprise parallel ears through which aligned openings are formed for purposes of receiving a connecting bolt 38 by which the innermost link on each of the chains 32 is secured to the shaft 22. It has been found that, for reasons not entirely understood at present, that this means for connecting the inner ends of the chains 32 to the shaft 22 results in rapid wearing of the links connected to the clevises 36 and the next link thereto on said chains 32, whereby frequent replacement of such chains is necessary either by removing the worn links, and thereby noticeably shortening the chains, or by replacing said chains with new chains of preferably the same original length of the worn chains.

It also was found that the material digging elements 34, which has similar clevises 40 thereof for purposes of connecting the digging elements 34 to the ends of the chains 32, likewise resulted in substantial wear and required relatively frequent replacement either of the entire chain or by removing the worn links and correspondingly shortening the effective length of the chains.

After studying the problem of undue wear such as referred to above and considering certain possible solutions to increase the life of the chains and especially the opposite ends thereof which respectively were connected either to the shaft 22 or the material digging members 34, the present invention has been devised which is illustrated in FIGS. 4–12, to which attention is now directed, as follows.

Figures 4, 6, 7, 8, 9, 10, 11, 12:
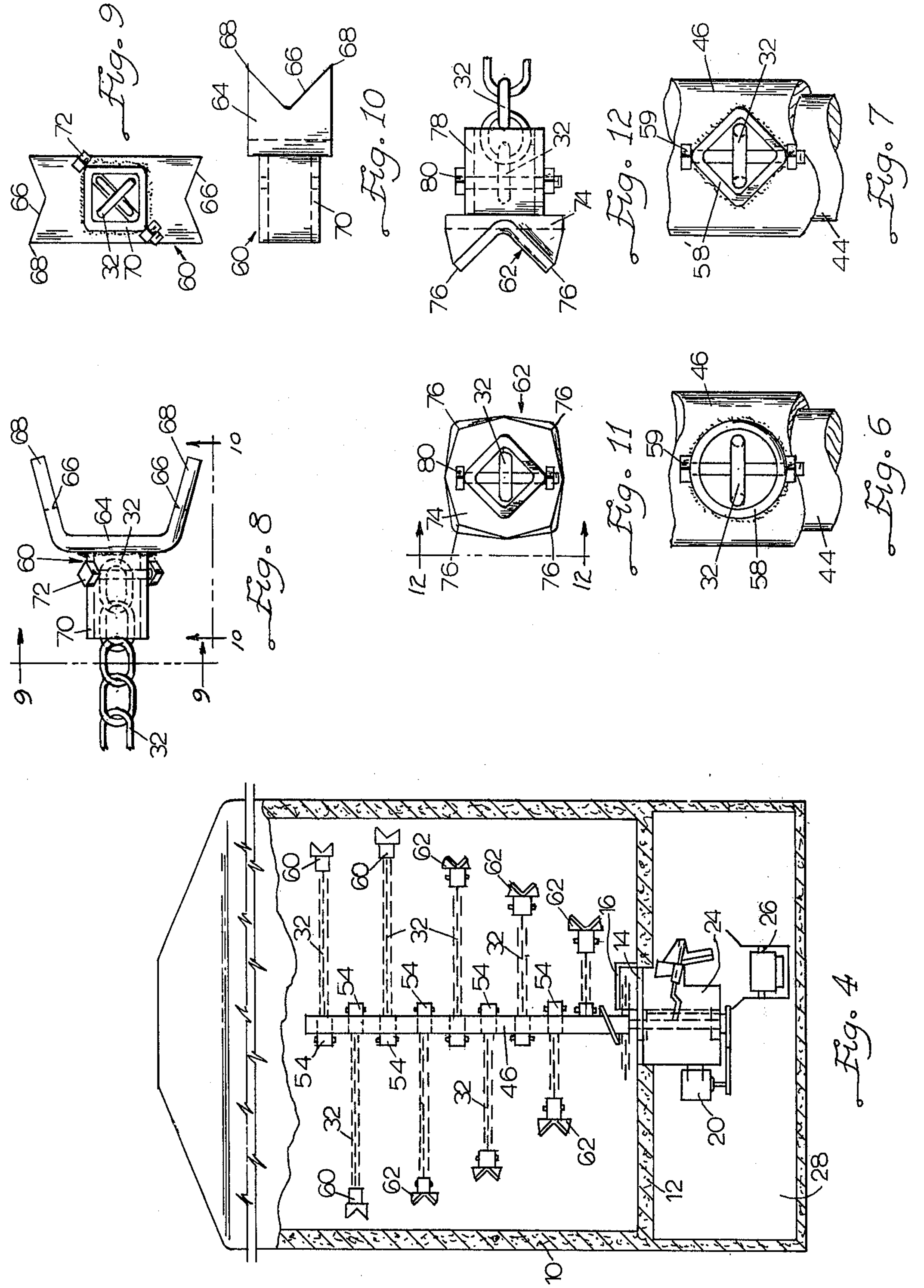
FIG. 4 is a view similar to FIG. 1 but illustrating the improved means for connecting the oppostie ends of the chains respectively to a central shaft and the digging and raking members respectively connected to the opposite ends of said chain.
FIG. 6 is a fragmentary vertical elevation on a larger scale than in FIG. 5 and showing the end of the connecting means illustrated in FIG. 5 as seen on line 6—6 thereof.
FIG. 7 is a view similar to FIG. 6 but showing a further embodiment of said connecting means.
FIG. 8 is a fragmentary plan view, on a larger scale than in FIGS. 4 and 5, showing a preferred type of connecting means by which material digging members are connected to the outer ends of certain of the chains of the silo arrangement shown in FIGS. 4 and 5.
FIG. 9 is an end view of the digging member shown in FIG. 8 as seen on the line 9—9 thereof.
FIG. 10 is a side elevation of the digging member shown in FIG. 8 as seen from the line 10—10 of FIG. 8.
FIG. 11 is a view similar to FIG. 9 but showing the end view of a raking member, such as employed on the shorter chains shown in FIG. 4, and illustrating the preferred manner of connecting the outer end of the chains thereto.
FIG. 12 is a side elevation of the digging member shown in FIG. 11 as seen on the line 12—12 thereof.

In FIG. 4, the basic elements of the silo are similar to those shown in the prior art such as illustrated in FIG. 1. Accordingly, common reference characters are applied to the structural members commonly shown in the two figures. The principal differences between the prior art and the present invention reside in the means by which the inner ends of the chains are connected to the central shaft, the structure of the material-engaging members connected to the outer ends of the chains and certain of the same comprising digging elements while others comprise raking elements, the means by which said members are connected to the outer ends of the chains, and the preferred structure of the central shaft itself. Such differences and the details and characteristics thereof are as follows.

Figure 5:
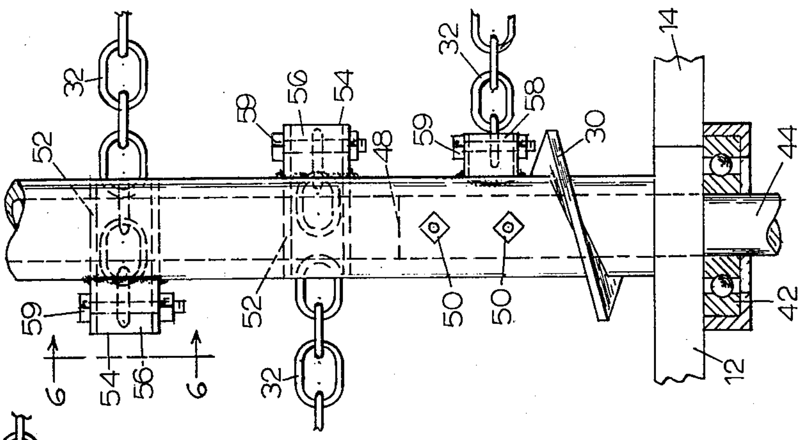
FIG. 5 is a fragmentary, enlarged, vertical elevation showing the lower portion of the central shaft of the silo shown in FIG. 4 and illustrating in greater detail the means by which the inner ends of the chains are connected to said central shaft.

As best shown in FIG. 5, immediately below the bottom 12 adjacent the discharge opening 14, a bearing 42 is mounted to support a drive shaft 44 of predetermined diameter, such as the order of three or four inches, depending upon the diameter of the silo and the height and diameter of the central shaft 46 which is connected to and extends upward from the drive shaft 44, said central shaft preferably being tubular, especially for purposes of providing substantial strength to resist bending relative to the amount of metal from which the tubular shaft is formed. The drive shaft 44 extends a predetermined distance above the upper surface of bottom 12, the upper end 48 thereof being clearly shown in FIG. 5. To securely connect the drive shaft 44 to the lower end of the tubular central shaft 46, a plurality of bolts 50 extend transversely through both of the same at locations which will not interfere with the auger 30 which is similar in length and diameter, relative to the size of the central shaft, as in the embodiment shown in FIG. 3 representing the prior art.

For purposes of connecting the chain 32 to the central shaft 46, the present invention utilizes openings 52 which extend transversely through the tubular shaft 46 at vertically spaced locations of the order of between one and two feet apart, depending upon the height and diameter of the silo. Within these openings 52, short tubes 54 are mounted and are rigidly fixed with respect to the cental shaft 46, such as by weldments. The inner diameters of the tubes 54 are very slightly greater than the width of the links of the chains 32, whereby the so called inner ends of said chains are disposed within the short tubes 54 substantially for the full lengths thereof. It also will be seen from FIG. 5 in particular that one end of tubes 54 extend a short distance beyond the outer surface of the central shaft 46, while the opposite end of said tubes are substantially flush with said outer surface.

For purposes of securing the ends of the chains 32 within the projecting ends 56 of tubes 54, said projecting ends are provided with diametrically aligned openings in opposite sides of said projecting ends for purposes of receiving bolts 58 which also extend through the terminal link of the end portions of the chains 32 which are disposed within the tubes 52. This results in the chains 32 being very flexibly secured to the tubes 54 in a manner which it has been found results in minimum wear between the links disposed within the tubes 54 and the links immediately connected thereto. It will also be seen that by utilizing such means for connecting the inner ends of the chains 32 to the central shaft 46, such connection may be made quickly and effectively, either at the time the chains initially are being assembled with the shaft or at the time when replacement of the chains may be necessary.

Considering the lowermost chains shown in FIG. 5, which is disposed immediately above the upper end of the auger 30, and in a portion of the tubular shaft 46 within which the drive shaft 44 is disposed, a very short section 58 of the tubular material such as that from which the short tubes 54 are formed is secured at one end to the exterior surface of central shaft 46, such as by welding, the length of the section 58 being adequate to receive the terminal link at the inner end of said lowermost chain for purposes of having a bolt 59 disposed through aligned openings formed in the opposite walls of the section 58 and also extend through said terminal link.

Referring to FIG. 4, it will be seen that the uppermost chain 32 is slightly shorter than the two chains immediately therebelow on the upper end of central shaft 46. However, the two chains immediately below the uppermost chain 32 are of such length that the material-engaging elements or members on the outer ends thereof nevertheless are spaced a short distance from the inner surface of the side walls of the silo 10. By such arrangement, a more arched effect is provided in the so-called ceiling of comprising the lower end of the compacted mass of silage material stored within the conveyor 10, as compared with such arched surfaces formed in said material when the uppermost chain is the longest and all chains therebelow progressively are shorter than the uppermost. In accordance with the principles of the invention, therefore, the two or three chains which are the longest and uppermost on the central shaft 46 have digging members 60 connected to the ends thereof, while on the outer ends of the chains therebelow, raking members 62 are connected. These members respectively are illustrated in FIGS. 8–10 and FIGS. 11 and 12. Also, with respect to the very short section 58 which forms a socket in which the terminal link on the inner end of the lowermost chain 32 is disposed, may be either circular in cross section, as shown in FIG. 6, or as a modification thereof, the same may be substantially square in cross section, as shown at 58′ in FIG. 7. Similarly, if desired, the short tubes 54, while preferably circular in cross section, also may be substantially square in cross section as in regard to the section 58′ shown in FIG. 7.

Referring to FIGS. 8–10, it will be seen that the digging members 60, which are formed from metal, comprise a plate member 64 which preferably is longer than it is wide. V-shaped notches 66 are formed in the opposite ends thereof to provide digging points 68. To render such points more effective, the end portions of the plate member 64 are bent at obtuse angles with respect to the intermediate portion, as shown in FIG. 8, whereby a somewhat U-shaped configuration is formed in order that the digging points 68 may project from the outer surface of the plate member 64. Connected to the opposite face of plate member 64 is a short tubular socket 70 which is connected by welding or the like at one end to said opposite face of plate member 64. As shown in FIG. 9, in which an end view of the socket 70 is shown, it will be seen that the preferred configuration is square. If desired however, a circular configuration may be employed in lieu of the square arrangement. However, the square arrangement is advantageous in view of the fact that the terminal link 32′ on the outer end of the chain 32 may be closely disposed diagonally between opposing corners of the sockets 70, whereby a securing bolt 72 may extend through appropriately aligned openings in the alternate corners of sockets 70, as shown in FIG. 9, said bolt also extending through the terminal link 32′, as shown in FIG. 8, for purposes of loosely connecting the digging members 60 to the terminal ends of the longer chains connected to the upper end portion of the central shaft 46 as shown in FIG. 4. Such arrangement has been found to minimize the wear between the links on the outer ends of said chain and thereby greatly extend the life thereof as compared with the connecting means previously used in the prior art referred to above.

Referring to the raking member 62, details of which are shown in FIGS. 11 and 12, it will be seen that the same comprise substantially square plates 74. The corners 76 thereof are bent away from the same surface of the plates 74, at an obtuse angle to said central portion of said plates, whereby the corners 76 provide raking points but the same preferably are less sharp than the points 68 of the digging members 60. Furthermore, the configuration of the plates 74 with the bent corners 76 are such as to provide a raking action when the members are extended outwardly from the outer ends of the chains 32 during the rotation of the central shaft 46. Such outward projection of the chains and raking members 62 thereon is caused by the centrifugal force resulting from the rotation of the entire assembly of chains 32 and central shaft 46. Due to the fact however that the greatest digging effort is required by the chains closest to the lower surface of the accumulated mass of silage in the upper portion of the silo, the digging members 60 are provided on the longer chains adjacent the upper end of the shaft 46.

For purposes of securing the raking members 62 to the outer ends of the shorter chains 32, socket members 78, which are shown in FIG. 11, preferably are square in cross section, but may be circular if desired, are fixedly connected to the opposite faces of the square plates 74 from the faces from which the corners 76 extend. Such connection preferably is by welding. Also, the length of the sockets 78 is such as preferably to at least receive the entire terminal link 32' of the shorter chains 32, as in regard to the length of the sockets 70 which are connected to the digging members 60.

Firm connection of the terminal links 32' of the shorter chains 32 within the socket members 78 is effected by means of a bolt 80 which extends through axially aligned holes formed in opposite corners of the socket members 78, whereby the terminal links 32 may be disposed between the intermediate opposite corners of the socket members 78 and thereby provide effective positioning of said terminal links 32' within the socket members 78. Such arrangement also forms a desirable flexible connection between the terminal ends of the shorter chains 32 and the raking members 62 so as to result in minimum wear and produce long life, as in regard to the connection between the outer ends of the longer chains 32 and the digging members 60.

From the foregoing, it will be seen that the present invention provides as its primary objective means by which the opposite ends of material removing chains utilized in bottom unloading mechanism for silos may be connected respectively to a central shaft and material-engaging members, such as either digging members or raking members connected to the outer ends of said chains. Such connecting means are of a simple nature capable of minimum effort to effect connections of the various means to the opposite ends of the chain, but the important feature comprising the flexibility afforded by such connections which results in substantially longer life than the connecting means currently and previously utilized in bottom unloading structures utilizing chains for material dislodging purposes. The longer life resulting from such connections is highly desirable so as to minimize the times when it is necessary to interrupt unloading operations as when breakage occurs and requires repairing of such connection. Effecting such repairs also is not only time consuming but dangerous because it obviously must be conducted when there is a space around the central shaft as when the lower surface of the compacted silage in the silo is bridged over the upper end of the central shaft, at least temporarily, while the shaft and the chains connected thereto are idle. There always is the possibility that the bridge effect will be ruptured and the overhead mass of material will come falling down by gravity upon the repairman. Accordingly, aside from the time consuming feature of such repairs it is obvious that the fewer repairs needed, the better.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. Material dislodging means for a silo having a discharge opening in the bottom comprising a shaft adapted to be supported for rotation about an axis, a plurality of chains arranged with inner ends adjacent said shaft at spaced locations therealong, and outer ends adapted to swing freely outward of said shaft on rotation thereof for engaging said material, and means connecting said inner ends of said chains to said shaft, connecting means for at least one of said chains, comprising means defining an opening extending transversely through said shaft for receiving a terminal link at the inner end of a chain extended therethrough with at least a portion of said terminal link extending outwardly of the surface of said shaft, pin means extending transversely through said projecting terminal links on said chains to secure the chains to said shaft, and a sharp material dislodging member connected to the outer end of each chain.

2. The material dislodging means according to claim 1 in which said openings in said shaft are each provided with a tube fixed therein, the inner diameter of said tubes being substantially equal to the width of the links of said chain and respectively adapted to receive at least the terminal link at the inner end of a chain to connect the same to said shaft.

3. The material dislodging means according to claim 2 in which one end of said tubes projects a short distance outwardly of the exterior surface of said shaft and is formed with a hole extending transversely therethrough to receive said pin means and thereby secure a terminal link at the inner end of a chain against transverse movement with respect to said shaft.

4. The material dislodging means according to claim 2 in which said shaft is tubular, and said dislodging means also including a drive shaft received telescopically within an end portion of said tubular shaft for a predetermined minor distance relative to the total length of said tubular shaft, and fastening means extending through said lower portion of said tubular shaft and said drive shaft for securing the same together for common rotation about the axis of said tubular shaft.

5. The material dislodging means according to claim 1 in which said chains have a length less than the radius of the inner surface of the silo in which said dislodging means is adapted to be mounted, whereby the material engaging members on the outer end of said chains move in a path spaced a limited distance inwardly of the interior surfaces of said silo upon rotation of said shaft.

6. The material dislodging means according to claim 5 in which one of said chains is shorter than at least another of said chains spaced below said one chain.

7. The material dislodging means according to claim 5 in which said material-engaging members on at least one of said chains have sharp digging points thereon and the material-engaging members on at least another of said chains have raking members connected to the outer ends thereof.

8. The material dislodging means according to claim 1 in which said material-engaging member on the outer end of at least one of said chains has a tubular socket thereon projecting inwardly toward said shaft for receiving at least a terminal link at the outer end of said chain, and further including pin means extending transversely through the walls of said socket and said outer terminal link of said chain.

9. The material dislodging means according to claim 8 in which said tubular socket on said material-engaging member is substantially square in cross section and the terminal link at the outer end of said chain extends between opposing corners of said socket for accurate positioning of the chain within said socket.

10. The material dislodging means according to claim 8 in which said material-engaging member includes a plate member and said socket has one end secured to one face of said plate member, said plate member including opposite end portion bent outwardly from an opposite face of said plate member for providing pointed material engaging projections.

11. The material dislodging means according to claim 10 in which said plate member of said material-engaging member comprises an elongated strip having a greater length than the width, and opposite end portions of said strip having V-shaped notches forming pairs of points on each end, and said end portions of said strip being bent outwardly at obtuse angles from said opposite face providing sharp engaging points extending outwardly from the outer end of said chain to which said plate member is connected when said shaft is rotated.

12. The material dislodging means according to claim 10 in which said plate member of said material-engaging member is connected to a chain shorter in length than another, said plate member being substantially square in plan view and having corner portions thereof bent outwardly at obtuse angles from a face opposite socket extends on each of said members to form raking points projecting outwardly from the ends of said chains when in use.

13. The material dislodging means according to claim 8 in which said socket of said material-engaging member is longer than said outer terminal link of said chain extended therein, whereby said outer terminal link at the outer end of said chain is contained entirely within said socket.

* * * * *